(12) United States Patent
Gouerec et al.

(10) Patent No.: US 11,072,722 B2
(45) Date of Patent: Jul. 27, 2021

(54) PENCIL LEAD

(71) Applicant: SOCIETE BIC, Clichy (FR)

(72) Inventors: Julien Gouerec, Boulogne-sur-Mer (FR); Frédéric Claptien, Samer (FR); Philippe Lefebvre, Wimereux (FR); Christelle Debrauwer, Saint-Germain sur Morin (FR)

(73) Assignee: SOCIETE BIC, Clichy (FR)

( * ) Notice: Subject to any disclaimer, the term of this patent is extended or adjusted under 35 U.S.C. 154(b) by 110 days.

(21) Appl. No.: 16/604,220

(22) PCT Filed: Apr. 9, 2018

(86) PCT No.: PCT/FR2018/050882
§ 371 (c)(1),
(2) Date: Oct. 10, 2019

(87) PCT Pub. No.: WO2018/189467
PCT Pub. Date: Oct. 18, 2018

(65) Prior Publication Data
US 2020/0115581 A1    Apr. 16, 2020

(30) Foreign Application Priority Data
Apr. 10, 2017   (FR) ...................... 1753102

(51) Int. Cl.
| C09D 13/00 | (2006.01) |
| B43K 19/02 | (2006.01) |
| B43K 29/02 | (2006.01) |
| B43K 19/18 | (2006.01) |
| C08K 3/04  | (2006.01) |
| C08K 7/22  | (2006.01) |

(52) U.S. Cl.
CPC .............. *C09D 13/00* (2013.01); *B43K 19/02* (2013.01); *B43K 29/02* (2013.01)

(58) Field of Classification Search
None
See application file for complete search history.

(56) References Cited

U.S. PATENT DOCUMENTS

| 5,075,054 A | 12/1991 | Handl |
| 5,118,345 A * | 6/1992 | Handl .................. C09D 13/00 106/31.11 |
| 9,988,546 B2 * | 6/2018 | Claptien ............... B43K 19/18 |
| 10,308,063 B2 | 6/2019 | Claptien et al. |
| 10,316,208 B2 * | 6/2019 | Gouerec ............... B43K 19/02 |
| 10,814,665 B2 * | 10/2020 | Gouerec ............... B43K 19/16 |
| 2006/0194049 A1 * | 8/2006 | Thies ................... B43K 19/16 428/375 |
| 2011/0129284 A1 * | 6/2011 | Thies ................... B43L 23/08 401/49 |
| 2012/0037035 A1 | 2/2012 | Banzai et al. |
| 2013/0330112 A1 | 12/2013 | Lee |
| 2016/0362574 A1 * | 12/2016 | Banzai ................. C09D 13/00 |
| 2018/0001694 A1 * | 1/2018 | Claptien ............... B43K 19/18 |

FOREIGN PATENT DOCUMENTS

| FR | 2637906 | 4/1990 |
| JP | 57-14666 | 1/1982 |
| WO | 2016/097553 | 6/2016 |
| WO | WO 2016/097554 A1 * | 6/2016 |
| WO | WO 2017/220914 A1 * | 12/2017 |

OTHER PUBLICATIONS

International Search Report dated Jun. 22, 2018 from corresponding International PCT Patent Application No. PCT/FR2018/050882, 3 pages.

* cited by examiner

*Primary Examiner* — Helene Klemanski
(74) *Attorney, Agent, or Firm* — Ohlandt, Greeley, Ruggiero & Perle, L.L.P.

(57) ABSTRACT

A pencil lead and a pencil containing the pencil lead wherein the pencil lead is polymer-based, extrudable, non-expanded, non-calcined and comprises graphite, of which 25% to 100% by weight or 50% to 100% by weight of the graphite, in relation to the total weight of the graphite, is expanded graphite.

13 Claims, No Drawings

PENCIL LEAD

CROSS REFERENCE TO RELATED APPLICATION

This application is a National Stage application of International Application No. PCT/FR2018/050882, filed on Apr. 9, 2018, now published as WO2018/189467 and which claims priority to French Application No. 1753102, filed Apr. 10, 2017, the entire contents of which is incorporated herein by reference.

BACKGROUND

1. Field

The present disclosure relates to a non-calcined, polymer-based pencil lead, comprising expanded graphite.

2. Description of Related Art

Natural graphite is routinely used in extrudable polymer-based (that is to say, synthetic and non-calcined) pencil leads, such as, for example, in the application WO2016/097553. The selection of the type of natural graphite and the weight ratio between the graphite and the polymer of the lead are known to play a role in the blackness of the mark obtained with the pencil and thus have an impact on the effectiveness of erasing. However, the disadvantage is that the mechanical properties are also impacted. In addition, the polymer, the plasticizers and the additives of this type of lead impede the erasing action. In fact, these materials prevent the eraser from being in direct contact with the graphite to be removed during erasing on the surface of the sheet of paper. The eraser therefore must remove both the graphite and the plastic derivatives, which is never completely achieved. Thus, in general, the erasing leaves a dark mark/shadow on the paper.

The inventors observed surprisingly that a particular type of graphite, expanded graphite, made it possible to improve the action of the erasing of the marks left by the synthetic, that is to say, polymer-based pencil leads, in spite of the presence of these plastic materials, without having a negative impact on the mechanical properties. In fact, the difference between natural graphite and expanded graphite is that the intermediate layer between the two graphite lamellas is much larger for expanded graphite. Therefore, the inventors think that this particular feature acts as a nano filler which seems to prevent the fine particles from being pressed into the fibers of the paper. The erasing is then more effective. The improvement of the effectiveness of erasing is visible, for example, by comparison between an example according to the application WO2016/097553 (comparative example 1) and an example with expanded graphite instead of natural graphite (example 1).

Additionally, expanded graphite has been known to be used in a mixture with natural graphite in calcined leads in order to improve its mechanical properties.

However, this type of lead contains no plastic materials at the end of the process, that is to say, in the final lead. In fact, the synthetic resins are only used for the mechanical working of the material to help in shaping the lead in the form of a thread by a compression spinning method. Then, the synthetic resins are progressively eliminated until complete disappearance in the manufacturing process during the calcining step. This type of lead, thus, does not encounter the same technical problem as most polymer-based leads, that is to say, the problems of erasing difficulty, since there is only graphite in the mark to be erased on the paper.

Other known leads include a petal-like graphite having particular physical properties. However, such a graphite is of natural origin and is not an expanded graphite.

In addition, this petal-like graphite is not used as is in the pencil leads but in combination with nanoparticles which are brought in contact with this graphite and even adhere to it in such a manner as to form a composite.

Moreover, the pencil leads containing such a graphite are calcined leads.

Finally, the purpose of using this particular graphite and the composite which it forms with the microparticles is not to improve the erasing performances but, on the contrary, to reinforce the color of the lines drawn with the lead of the pencil.

SUMMARY

The disclosure, thus, relates to a pencil lead which is polymer-based, extrudable, non-expanded, non-calcined and comprises graphite, wherein according to some examples, 25 to 100% by weight and according to other examples, 50 to 100% by weight of graphite, in relation to the total graphite weight, consists of expanded graphite.

DETAILED DESCRIPTION

The lead, according to the present disclosure, belongs to the category of polymer-based graphite leads, also referred to as synthetic lead, and is thus non-calcined. Therefore, a no calcining step is used in the manufacturing method.

In the sense of the present disclosure, "polymer-based pencil lead" is understood to mean any pencil lead comprising at least one polymer. This polymer thus functions as a matrix for the production of the lead during the manufacturing method and also governs the mechanical properties, the writing quality and erasing quality in the finished product.

In an embodiment, the lead according to the disclosure comprises, for example, between 15% and 40% by weight, or between 20% and 35% by weight, or between 25% and 32% by weight of a polymer in relation to the total weight of the lead.

In another embodiment, the polymer of the lead is selected from the group consisting of a polyolefin, a styrene polymer and mixtures thereof. If a mixture of polyolefin and styrene polymer is used, a compatibilizer known to the person skilled in the art (for example: maleic anhydride grafted polyolefin, Fusabond from Dupont) can be added.

In the case in which the lead comprises a polyolefin, the lead will be referred to as "polyolefin-based lead" in the context herein.

Thus, the "polyolefin-based pencil lead" is understood to mean any pencil lead comprising at least one polyolefin. In a polyolefin-based lead according to the disclosure, the polyolefin is the main polymer of the lead. Even more, the polyolefin-based lead comprises no other polymers. The polyolefin can be selected from the group consisting of polyethylene, polypropylene and mixtures thereof; in particular, it is polypropylene, more particularly polypropylene homopolymer.

In the case in which the lead comprises a styrene polymer, it will be referred to as "styrene polymer-based lead" in the context herein.

Thus, the "styrene polymer-based lead" is understood to mean any pencil lead comprising at least one styrene polymer.

In a styrene polymer-based lead according to the disclosure, the styrene polymer is the main polymer of the lead. Even more, the styrene polymer-based lead comprises no other polymers. The styrene polymer is selected from the group consisting of polystyrene (PS), a styrene-acrylonitrile copolymer (SAN), an acrylonitrile-butadiene-styrene copolymer (ABS) and mixtures thereof, in particular from the group consisting of an acrylonitrile-butadiene-styrene copolymer (ABS) and polystyrene (PS).

In yet another embodiment, the polymer of the lead is selected from the group consisting of polyethylene, polypropylene, polystyrene, a styrene-acrylonitrile copolymer, an acrylonitrile-butadiene-styrene copolymer and mixtures thereof.

The lead according to the present invention is extrudable, that is to say, that the lead can be obtained by extrusion. The lead is non-expanded, in spite of the presence of expanded graphite in its composition. In fact, a no expansion agent is used in the manufacturing method. In addition, the polymer used is not expanded.

The lead according to the present invention is a pencil lead intended to be used in pencils. In particular, the lead is intended for use in pencils coated with wood or with a synthetic wood material, or optionally with pencils comprising an intermediate protective layer.

The pencil lead comprises graphite, of which for example, 25% to 100% by weight or 50% to 100% by weight of graphite, in relation to the total weight of the graphite, consists of expanded graphite.

In an embodiment, 100% by weight of the graphite consists of expanded graphite.

The expanded graphite can be manufactured from natural or synthetic graphite by methods which are well known to the person skilled in the art, such as by insertion of acid, in particular, insertion of sulfuric acid, in the lamellar structure of the graphite. The graphite obtained is referred to as expandable graphite. It then is exposed to a thermal shock at very high temperature: the insertion element vaporizes and expands each graphite crystallite.

The expanded graphite is also commercially available under the name TG-679 GRAFOIL from the company GrafTech international, under the name TIMREX® BNB90 from the company Imerys, under the name SC 20 OS from the company Graphit Kropfmühl GmbH, or under the name SC 50 QKG from the company QUINDAO KROPFMUEHL GRAPHITE.

The specific surface area (BET method) of the expanded graphite is greater than 18 $m^2/g$, in particular ≥20 $m^2/g$.

The sulfur content of the expanded graphite is greater than 400 ppm, in particular ≥500 ppm in relation to the total weight of the expanded graphite.

In an embodiment, the pencil lead comprises, for example, between 40% and 60% by weight, or between 44% and 50% by weight of graphite in relation to the total weight of the lead, of which is 25% to 100% by weight, or 50% to 100% by weight, or 100% by weight of said graphite, in relation to the total weight of the graphite, consists of expanded graphite.

Thus, the pencil lead according to the present disclosure can comprise between 10% and 60% by weight, or between 11% and 60% by weight, or between 20% and 60% by weight, or between 22% and 50% by weight of expanded graphite, in relation to the total weight of the lead.

The rest of the graphite, if present, is not expanded and can be natural graphite.

The graphite, whether expanded or non-expanded, can be in powder form.

In particular, the graphite, whether expanded or non-expanded, has a particle size D50 by volume measured by laser granulometry, for example, by a laser granulometer (diffraction) of the Sympatec Helios brand, between 4 and 40 µm, or between 15 and 40 µm, or between 15 and 25 µm (volumetric measurement of the particle size distribution Fraunhofer method ISO 13320).

The graphite makes it possible to give the lead good mechanical properties, in particular, resistance to bending, and softness during writing, while at the same time contributing some of the blackness.

The expanded graphite, moreover, makes it possible to improve the erasing properties.

The graphite according to the present disclosure, in particular the expanded graphite, is not used in combination with microparticles, in particular microparticles, and even more particularly does not form a composite with such microparticles.

The graphite according to the present disclosure is also not a petal-like graphite having the particular physical properties of other known graphite leads.

In addition to the polymer and the graphite, the pencil lead of the present disclosure can comprise a colorless or white mineral filler, in particular with a content between 5% and 15% by weight, or between 6% and 10% by weight, in relation to the total weight of the lead.

In an embodiment, the colorless or white mineral filler, for example, is selected from the group consisting of a clay, talc, boronitride, silica, calcium carbonate, mica, steatite powder and mixtures thereof. In other examples, the colorless or white mineral filler is selected from the group consisting of a clay, silica, talc and mixtures thereof. According to other examples, the pencil lead includes a lamellar colorless or white mineral filler, selected from the group consisting of a clay, boronitride, mica, talc and mixtures thereof; orincludes a clay, selected from the group consisting of montmorillonite, bentonite, kaolin and mixtures thereof; more particularly it is kaolin, in particular kaolin having a particle size D50 by weight measured by sedimentation, for example, using a SEDIGRAPH® apparatus from the company Micromeritics, of between 2 and 5 µm, for example, as marketed by the company SOKA under the name BLANKALITE 77.

The purpose of the silica and the talc is to contribute mechanical properties to the lead, such as resistance to bending or resistance to breaking. The lamellar mineral fillers have the purpose of contributing softness during writing and of maintaining a structure which splits on the paper in the manner of the graphite sheets.

The pencil lead can comprise carbon black, in particular with a content, for example, of between 5% and 20% by weight, or between 5% and 15% by weight in relation to the total weight of the lead.

The carbon black used is in particular carbon black coated with or mixed with a polyolefin wax or a polyolefin, in particular coated with or mixed with a polyolefin wax (for example, in the form of a master mix, a pigment preparation or a dispersion of carbon black in a wax or in the polyolefin, in particular in a wax).

The carbon black makes it possible to contribute blackness to the lead, while the polyolefin wax or the polyolefin makes it possible to improve the ease of erasing, since polyolefin prevents the carbon black powder from penetrating into the support on which the mark is made with the pencil comprising the lead according to the present disclosure. The mixing or coating with the polyolefin or the polyolefin wax thus takes place before addition to the composition of the lead.

The polyolefin wax is more advantageous than a polyolefin, since the softness on the paper is better with a carbon black mixed with or coated with a polyolefin wax than with a polyolefin. In addition, the dispersion in the mixture and thus the homogeneity and the blackness are better with the use of a coating or of a mixture with the polyolefin wax.

The polyolefin is polypropylene or polyethylene or a mixture thereof. In some examples, the polyolefin is polyethylene, such as, low-density polyethylene.

In a particular embodiment, the carbon black content of the carbon black coated with or mixed with a polyolefin wax or a polyolefin is between 25% and 65% by weight, or between 30% and 60% by weight, in relation to the total weight of the carbon black coated with or mixed with a polyolefin wax or a polyolefin.

In a particularly advantageous embodiment, the carbon black used in the lead is carbon black coated with a polyolefin wax. The carbon black content of the carbon black coated with a polyolefin wax is between 40% and 65% by weight in relation to the total weight of the carbon black coated with a polyolefin wax.

The polyolefin wax is a polypropylene wax or a polyethylene wax or a mixture thereof. In some examples, the polyolefin wax is a polyethylene wax, such as, a low-density polyethylene wax.

The carbon black coated with a polyolefin wax is commercially available from the company SunChemical under the name Sunfast® PE Flush Black L47-9000.

Finally, the pencil lead according to the present disclosure can comprise an additive, in particular with a content between 0% and 16% by weight, or between 5% and 15% by weight, in relation to the total weight of the lead.

This additive can be selected from additives which are well known to the person skilled in the art in the field of pencil leads, in particular from the group consisting of the slip agents, mechanical working agents, coupling agents, dispersing agents, lubricants, plasticizers and mixtures thereof; or selected from the group consisting of stearates such as calcium stearate, magnesium stearate, sodium stearate, zinc stearate and mixtures thereof; amides, in particular stearamides such as ethylene bis stearamide, waxes, fatty acids, glycerol and its derivatives such as glycerol behenate, glycerol dibehenate, glycerol stearate; and/or polyglycerol diisostearate, in particular glycerol behenate, siloxane grafted on polypropylene, maleic anhydride grafted polypropylene, phthalate, adipate, benzoate, sebacate; and/or citrate plasticizers and mixtures thereof; or from the group consisting of calcium stearate, ethylene bis stearamide, phthalates and mixtures thereof.

The lead according to the present disclosure comprises calcium stearate, in particular with a content between 2% and 10% by weight, or between 3% and 9% by weight, in relation to the total weight of the lead. The calcium stearate makes it possible to contribute softness and slip properties on the paper.

In another embodiments, the lead comprises an amide, in particular a stearamide such as ethylene bis stearamide, with a content between 0.5% and 3% by weight, or between 1% and 2.5% by weight, in relation to the total weight of the lead. The amide makes it possible to help in the dispersion of the fillers in the composition and also has a slight positive effect on the slip properties.

The lead can also comprise a phthalate such as a benzyl phthalate, in particular a $C_7$-$C_9$ alkyl benzyl phthalate, with a content between 0% and 4% by weight, or between 1% and 3% by weight, in relation to the total weight of the lead. The phthalate is a plasticizer.

Thus, in a particular embodiment, the pencil lead comprises, by weight in relation to the total weight of the lead:
  between 40% and 60% by weight, or between 44% and 50% by weight, of graphite;
  between 15% and 40% by weight, or between 20% and 35% by weight, of a polymer;
  between 5% and 15% by weight, or between 6% and 10% by weight, of a colorless or white mineral filler;
  between 5% and 20% by weight, or between 5% and 15% by weight, of carbon black, in particular carbon black coated with or mixed with a polyolefin or a polyolefin wax;
  between 0% and 16% by weight, or between 5% and 15% by weight, of an additive.

In another embodiment, the pencil lead according to the present disclosure comprises no palm oil.

In a particular embodiment, the pencil lead has a diameter between 2 and 3.9 mm; or a lead having a diameter between 2 and 2.3 mm (thin lead) or a lead having a diameter between 3 and 3.8 mm (thick lead) or a lead having a diameter between 3.4 and 3.8 mm (very thick lead).

The lead according to the present disclosure can have a hexagonal, round or triangular cross section, a round or hexagonal cross section.

The pencil lead can be manufactured by methods which are well known to the person skilled in the art.

For example, all the components are mixed together, and the mixture obtained is extruded at suitable temperatures. The lead obtained is then cooled. The lead is thus not calcined.

The lead exhibits an improved ease of erasing while possessing good mechanical properties, in particular, resistance to bending resistance and/or impact resistance.

The disclosure also relates to a pencil comprising a lead, in particular a pencil coated with wood or with synthetic wood material, comprising optionally an intermediate protective layer.

The pencil is obtained by coextrusion of the lead and of the synthetic wood material and optionally of the intermediate protective layer.

In particular, the synthetic wood material is based on styrene polymer, and the intermediate protective layer also plays the role of adhesion layer and advantageously can comprise a mixture of EVA and of polystyrene.

The synthetic wood material is expanded so as to have a density equivalent to natural wood.

In a particular embodiment, the pencil comprises an additional decorative layer, advantageously of varnish, surrounding the synthetic wood material, in particular concentrically. The decorative layer is made of a material that is compatible with that of the synthetic wood material.

The pencil according to the present disclosure can also have a hexagonal, round or triangular cross section, a round or hexagonal cross section.

The pencil can comprise a means for erasing, such as an eraser, at an unsharpened end of the pencil.

The disclosure will be understood better upon reading the description of the following examples which are given as a non-limiting indication.

Example 1

The table below is a collection of examples of compositions of pencil lead according to the present disclosure, which make it possible to obtain the characteristics of improvement of the ease of erasing and sufficient mechanical properties to be used in pencils.

TABLE 1

| Composition (wt. %) | example | | | |
|---|---|---|---|---|
| | No. 1 | No. 2 | No. 3 | No. 4 |
| Polypropylene | 26 | 26 | | |
| Acrylonitrile Butadiene Styrene (ABS) | | | | 30 |
| Polystyrene | | | 30 | |
| Non-expanded graphite | | | 23.5 | |
| Expanded graphite | 47 | 23.5 | 45 | 45 |
| Kaolin | 8 | 8 | 8 | 8 |
| Carbon black coated with polyethylene wax | 9 | 9 | 9 | 9 |
| Additive | 10 | 10 | 8 | 8 |
| Total | 100 | 100 | 100 | 100 |

Leads are then manufactured from these compositions by extrusion of a strip using a laboratory single-screw extruder, with 3 zones heated at 170° C. and a round die having a diameter of 2.3 mm followed by a drawing bench.

Example 2: 3-Point Flexural Strength Tests

The 3-point flexural strength of leads No. 1 to 4 manufactured according to example 1 was conducted according to NF EN ISO 178 of 2016—Plastiques Determination des Propriétés en Flexion [Plastics-Determination of Flexural Properties] except that extruded strips are used instead of injected dumbbell-format specimens. The flexural strength was compared to the results obtained with a comparative example having composition No. 1 except that the graphite is non-expanded (comparative example 1).

The results obtained are collected in the following table 2:

TABLE 2

| | Leads | | | | Comparative example 1 |
|---|---|---|---|---|---|
| | No. 1 | No. 2 | No. 3 | No. 4 | |
| Results | 0.684 daN | 0.662 daN | 0.749 daN | 0.692 daN | 0.560 daN |

The 3-point flexural strength of the leads according to the disclosure and that of the comparative example 1 are thus similar. The expanded graphite thus has no negative impact on the 3-point flexural strength of the lead.

Example 3

The effectiveness of erasing on paper was tested for leads No. 1 and 2 and compared with the lead of comparative example 1.

The test protocol is as follows:
Equipment:
Writing apparatus HUTT HST 10 or equivalent used under the following conditions:
  Writing speed: 4.5 m/min
  Writing angle: 70°
  Other parameters: refer to table 3 below
Iso paper: AURORA ISO-14145
Apparatus SpectroEye from X-Rite or equivalent
Pencil sharpener

TABLE 3

| | Parameters for producing the rubbings | Erasing parameters |
|---|---|---|
| Article type | Lead | Eraser |
| Lead or eraser diameter (mm) | 2.2 | From 6.5 to 8 |
| Paper feed (mm/min) | 0.2 | 0.2 |
| Total weight article/support/additional weight (g) | 360-365 | 185-190 |
| Writing length for axial rotation of the article (m) | 20 | 20 |
| Writing length (m) | 50 | Half of the rubbing |
| Paper type | AURORA ISO-14145 | Paper identical to the rubbing |

SAMPLE: 1 to 3 articles per reference
Operating Procedure:
1) Prepare the writing article in the appropriate supports, sharpen the lead if necessary.
2) Produce the rubbings according to the parameters indicated in the preceding table (only positions 3 to 8 on the scriptmeter device will be used).
3) Prepare the erasers in the appropriate supports.
4) Carry out the erasing starting from the half of the rubbing produced beforehand.
5) Measure the density of blackness of the rubbing and of the erasing with the help of the spectroEye (minimum 2 measurements per blackness) according to DIN 16536 NB, then calculate the corresponding Delta or express the percentage of the line that is erased:

Effectiveness of erasing %=(1−erased blackness/rubbing blackness)×100.

The results obtained are collected in table 4 below:

TABLE 4

| | Leads | | |
|---|---|---|---|
| | No. 1 | No. 2 | Comparative example 1 |
| Erasing effectiveness | 86% | 84.5% | 79% |

The erasing effectiveness is better for the examples according to the invention in comparison to the comparative example 1, the optimal effectiveness being obtained for lead No. 1.

It will be appreciated by those skilled in the art that changes could be made to the embodiments described above without departing from the broad concept thereof. It is understood, therefore, that the present concept disclosed herein is not limited to the particular embodiments disclosed and is intended to cover modifications within the spirit and scope of the present concept.

The invention claimed is:

1. A pencil lead which is polymer-based, extrudable, non-expanded, non-calcined, the pencil lead comprising: graphite, wherein 25% to 100% by weight of the graphite, in relation to a total weight of the graphite, consists of expanded graphite.

2. The pencil lead which is polymer-based, according to claim 1, wherein 100% by weight of the graphite consists of expanded graphite.

3. The pencil lead which is polymer-based, according to claim 1, wherein the expanded graphite is in powder form.

4. The pencil lead which is polymer-based, according to claim 1, comprising, by weight in relation to the total weight of the lead:

between 40% and 60% by weight of graphite;
between 15% and 40% by weight of a polymer;
between 5% and 15% by weight of a colorless or white mineral filler;
between 5% and 20% by weight of carbon black;
and between 0% and 16% by weight of an additive.

5. The pencil lead according to claim 1, wherein the polymer is selected from the group consisting of a polyolefin, a styrene polymer, polyethylene, polypropylene, polystyrene, a styrene-acrylonitrile copolymer, an acrylonitrile-butadiene-styrene copolymer, and mixtures thereof.

6. The pencil lead according to claim 4, wherein the colorless or white mineral filler is selected from the group consisting of a clay, talc, boronitride, silica, calcium carbonate, mica, steatite powder, and mixtures thereof.

7. The pencil lead according to claim 6, wherein the mineral filler is a clay selected from the group consisting of montmorillonite, bentonite, kaolin, and mixtures thereof.

8. The pencil lead according to claim 4, wherein the additive is selected from the group consisting of slip agents, mechanical working agents, coupling agents, dispersing agents, lubricants, plasticizers, stearates, amides, waxes, fatty acids, glycerol and derivatives of glycerol, siloxane grafted on polypropylene, maleic anhydride grafted polypropylene, phthalate, adipate, benzoate, sebacate and/or citrate plasticizers, and mixtures thereof.

9. The pencil lead according to claim 8, wherein the stearates are selected from the group consisting of calcium stearate, magnesium stearate, sodium stearate, zinc stearate, and mixtures thereof.

10. The pencil lead according to claim 8, wherein the amides are ethylene bis stearamide.

11. The pencil lead according to claim 8, wherein the derivatives of glycerol are glycerol behenate.

12. The pencil lead according to claim 1, characterized in that the pencil lead is extruded.

13. A pencil comprising a lead according to claim 1, the pencil including an eraser.

* * * * *